United States Patent [19]

Sekoulov et al.

[11] 4,113,612
[45] Sep. 12, 1978

[54] METHOD OF IMPROVING THE BACKWASHING OF FIXED BEDS FORMED OF GRANULAR MATERIALS

[75] Inventors: Ivan Sekoulov; Wolf-Rüdiger Müller, both of Stuttgart, Germany

[73] Assignee: Sulzer Brothers Limited, Winterthur, Switzerland

[21] Appl. No.: 771,959

[22] Filed: Feb. 25, 1977

[30] Foreign Application Priority Data

Mar. 4, 1976 [DE] Fed. Rep. of Germany ....... 2608899

[51] Int. Cl.² .......................... C02C 1/04; B01D 37/00
[52] U.S. Cl. .................................. 210/17; 210/63 R; 210/80
[58] Field of Search .................. 210/32, 63 R, 80–82, 210/17, 20, 73 S, 18

[56] References Cited

U.S. PATENT DOCUMENTS

| | | | |
|---|---|---|---|
| 1,966,279 | 7/1934 | Behrman | 210/32 |
| 2,105,835 | 1/1938 | Krause | 210/63 R |
| 3,282,702 | 11/1966 | Schreiner | 210/64 |
| 3,705,098 | 12/1972 | Shepherd et al. | 210/63 R |
| 3,932,278 | 1/1976 | Meidl et al. | 210/80 |

FOREIGN PATENT DOCUMENTS 1,389,530  4/1975  United Kingdom ...................... 210/32

*Primary Examiner*—Thomas G. Wyse
*Attorney, Agent, or Firm*—Werner W. Kleeman

[57] ABSTRACT

A method of improving the backwashing of fixed beds formed of granular materials and used during waste water purification or water treatment, wherein the fixed bed, during the course of the backwashing thereof, is maintained during a predetermined time duration filled with a quiescent liquid. This liquid contains at least one substance which is distributed as uniformly as possible therein. In the presence of a spontaneous, catalytically triggered decomposition reaction, this substance releases a gaseous component. Then, the fixed bed is backwashed with water.

23 Claims, 1 Drawing Figure

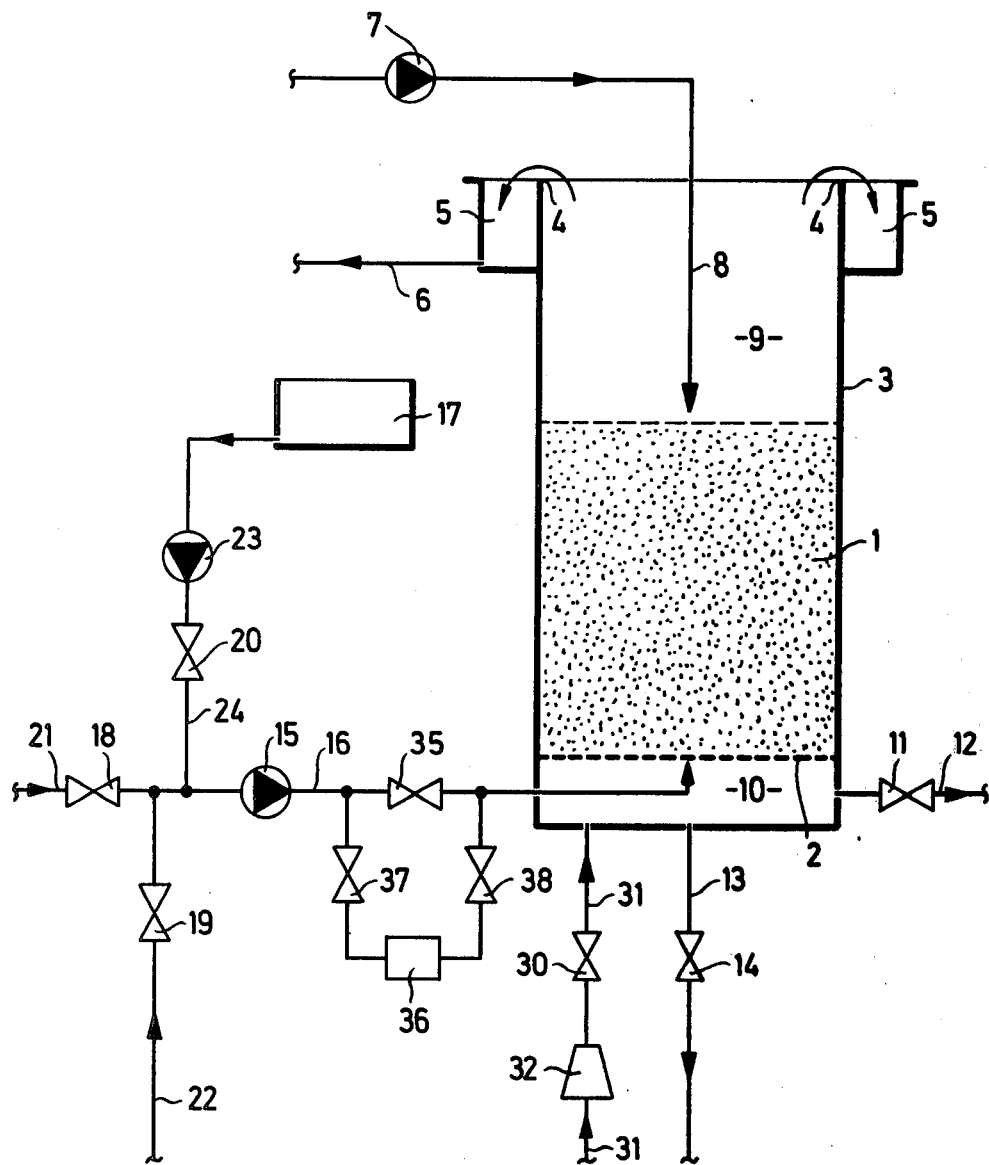

METHOD OF IMPROVING THE BACKWASHING OF FIXED BEDS FORMED OF GRANULAR MATERIALS

BACKGROUND OF THE INVENTION

The present invention relates to a new and improved method of, and apparatus for, improving the flushing or backwashing of fixed beds composed of granular materials, these fixed beds being typically employed during sewage treatment or waste water purification or water treatment. Examples of the aforementioned fixed beds or granular package are, for instance, sand filters, activated charcoal-adsorbers and ion exchangers.

In the context of the disclosure of this invention, the term "backwashing" or "backflushing" is used in its broader sense to embrace flow of the backwashing liquid not only counter-current to the treated liquid but also substantially in the same direction of the flow thereof.

The backwashing of fixed beds, for example rapid sand filters utilized for instance during purification of drinking water and treatment of waste water and through which filter the treated liquid, during operation, can flow upwards, downwards, or radially, generally is accomplished with air, air-water and/or purely by means of water. A great number of filter constructions are provided with mechanical devices for loosening or disintegrating the sand of the filter bed.

During the treatment of surface waters to obtain potable or drinking water and in the more extensive purification of waste water or sewage treatment there is oftentimes formed a type of algae-suspension-slime or activated sludge-suspension-slime. There is especially noted the effect of so-called mud ball formations. The sand granules stick together to form hard conglomerates, the diameter of which can reach as much as several centimeters and these sand grain-conglomerates are usually not capable of being disintegrated by the normal flushing operation. Generally, these mud balls predominantly consist of organic substances and microorganisms and additionally contain sand, further inorganic components, such as for example iron and calcium as well as nitrogen and oxygen.

A further effect is observed during waste water filtration as concerns the change in the structure of the sand bed. The sand grains or granules can be employed as the condensation core for coating biological growth and, for instance, can grow from an original diameter of 1 millimeter to a diameter up to 5 millimeters. This process is especially encountered in the case of sand filters which are employed at sewage disposal plants working with trickling filters.

Such mud ball-formations and/or the pronounced grain encasing-biological growth produce excessive head losses in the filter, resulting in shorter filter operating times. Moreover, an intense formation of mud balls impairs the quality of the filtration operation and is associated with the danger of breakthrough of the suspension, i.e. a rapid depletion of the filter capacity in holding back suspensions due to the presence of the mud balls which have not been washed out during filter backwashing.

A prior art technique of combating this effect which disturbs sand filtration contemplates employing extremely high flushing or backwash velocities (90–160 m/h) during backwashing with water and/or with a combination of water and air. The disadvantage of both of these backwashing techniques resides in the fact that an increase of the velocity of the backwashing liquid is not possible for technological reasons in the case of installations which are already in existence. With regard to newly constructed installations, water backwashing velocities $V_R > 60$ m/h are associated with technological process problems, requiring the construction of backwash water-storage basins which, in turn, lead to high additional investment- and operating costs. Experience has shown that backwashing with a water-air mixture leads to high losses in sand and there is not positively insured for the desired cleaning affect. Additionally, in existing plants the installation of devices which are needed for the backwashing operation and the conversion of the plant can only be carried out with great financial expenditure.

A further possibility of counteracting the formation of mud balls or the like and the grain coating-biological growth is to employ in the backwashing water oxidation agents, such as for instance peroxides, chlorine, as well as chlorine compounds (hypochlorite, chlorite, chlorate) in order to kill microorganisms in the filter and by an oxidative action obtaining destruction of the mud balls. Yet, when using chlorine there is the hazard of forming carcinogens and organic chlorine compounds which are difficult to eliminate biologically; both during the preparation of drinking water and during waste water purification this can lead to difficulties as concerns the handling of the backwashing water.

Additionally, due to the use of chlorine or chlorine-containing substances there is also destroyed the desirable microorganisms contained in the sand filter. The problem of "chemical contamination" of the backwashing water and/or the filtrate is generally not present when adding peroxides into the flow of the backwashing water, but throughflow backwashing where a peroxide (i.e. a weak oxidation agent) is added as the oxidizer to the backwashing water, has not proven to be completely satisfactory.

SUMMARY OF THE INVENTION

Hence, it is a primary object of the present invention to provide a new and improved method of improving the backwashing of fixed beds formed of granular materials in a manner not associated with the aforementioned disadvantages and limitations of the prior art proposals.

Another and more specific object of the present invention is concerned with eliminating the heretofore prevailing difficulties arising during backwashing of a fixed bed as regards the destruction of the mud balls and the like and the disturbing coatings or encasements, for instance of the sand granules or grains.

Still a further significant object is to devise a novel backwashing process for fixed beds which does not destroy the markedly aerobic microorganisms (e.g. nitrosomonas bacteria and nitrobacter) which are advantageous for the filtration process.

Now in order to implement these and still further objects of the invention, which will become more readily apparent as the description proceeds, the method aspects of the present invention contemplates maintaining the filter filled, during the course of the backwashing operation, for a predetermined period of time with a quiescent or static liquid. This liquid contains distributed as uniformly as possible therein at least one substance which, in the presence of a catalytic triggered-decomposition reaction, gives off a gaseous component, and thereafter the filter bed is backwashed with water.

According to the method of the invention the destruction or elimination of the mud balls is accomplished by the spontaneous release of a relatively large amount of energy during the decomposition reaction, at which time there is split-off from the remainder of the substance a gaseous component. The action contemplated by the invention, which especially resides in a splitting apart and disintegration of the mud balls, therefore, in the first instance, is especially of a mechanical nature. The expression "spontaneous reaction" thus can be explained in the context of the application in terms of a reaction which occurs while suddenly releasing considerable energy which results in the removal of the contaminants from the mud balls. As observations have shown, visible effects of the decomposition reaction first arise with a certain time-delay after filling the filter with the liquid, which preferably may be a true solution or — in the case of solid or liquidus substances which cannot be dissolved in water — a colloidal solution, so that the strived for effect cannot be realized or only to a very limited degree in a throughflow operation.

The period of time during which the fixed bed is filled with the liquid serves the purpose of enabling the catalytically triggered-decomposition reaction to be completed. This time is different from filter to filter and therefore must be experimentally determined, typically amounting to for instance 10 – 15 minutes when there is not added any catalyst. However, it depends upon the nature of the mud balls or the like contained in the filter and upon the nature of the infed, spontaneous reacting substance, which preferably may be a peroxide, especially hydrogen peroxide ($H_2O_2$), a nitrate, but also a perborate or a percarbonate. For instance, there can be checked in a very simple manner if the course of the time duration is satisfactory by adding a catalyst for the decomposition reaction into the filled filter bed after the disappearance of visible spontaneous reactions. If there does not occur any rejuvenation of the reaction, then there has been reached the point in time where there is to be performed the next step of backwashing the fixed bed with water.

If oxygen is released during the decomposition reaction, then there additionally occurs a certain amount of oxidation processes, by means of which it is possible to particularly affect the organic substances and microorganisms contained in the mud balls or the like and to predominantly attack anaerobic coatings with slimes or jackets of the sand grains.

By suitable selection of the spontaneous reacting substance it is furthermore possible to ensure that the residual product or products of the substance, which remain after giving-off the gas, do not cause any impermissible loading of the filter. These residual products therefore either must be harmless and/or easily removable from the filter and incapable of forming undesired products with other substances contained in the filter.

If there are absent in the filter filled according to the invention with the liquid, substances which trigger or accelerate the spontaneous catalytic reaction, then it is advantageous to add catalysts to the filter for the spontaneous decomposition of, for instance, hydrogen peroxide or other peroxides. Examples of suitable catalysts are manganese dioxide, iron, potassium permanganate, or an enzyme such as catalase. Manganese dioxide or iron can be incorporated into the bed of the filter as a likewise granular material, whereas catalase advantageously is added to the filter after the fixed bed-filter has been filled with the liquid.

The novel method of the invention can be used both as the sole means of backwashing the fixed bed or also in conjunction with conventional backwashing techniques carried out with air, water or air-water mixtures, and the method steps of the invention can be carried out before, during or after conventional backwashing.

If a possibly desired microbiological population should not be destroyed, then the concentration of the spontaneous decomposing substance or the reaction products possibly appearing in the backwashing water, should not exceed a predetermined value, since otherwise the backwashing water acts as a disinfectant; in the case of hydrogen peroxide this value can amount to, for instance, 3% by weight.

A further advantageous affect which can be obtained with the invention is that due to the decomposition of the substance contained in the backwashing water and while giving off a gas in the filter, there are formed fine gas bubbles which permeate the entire porous structure. These gas bubbles aid in loosening the fixed bed, and thus, provide for easier cleaning of the filter bed during the subsequent water backwashing operation.

A further advantage which can be realized with the invention is that if the proposed method steps are carried out prior to backwashing with water, there is accomplished a sufficient removal of the suspended substances out of the fixed bed even with low velocities of the backwashing water, since the bubbles at least in part tend to adhere at the suspension particles and thus produce a flotation effect.

If prior to placing the fixed bed-filter into operation there is carried out as the last step of the backwashing process, filling the filter a second time with a liquid of the same type—which neither must be identical with the first liquid either as concerns the decomposing substance nor with regard to the selected concentration — then there is realized a particularly favorable conditioning of the fixed bed-filter for the subsequent filtration. This filter conditioning, consisting of loosening of the filter bed and filling the same with gas pores generally produces during part of the operating time of the fixed bed-filter a dry filtering effect, as such as known for filters where the water to be filtered is applied as sprayed droplets with simultaneous throughput of air in the same direction of flow or counter-current flow. This dry filter effect, especially when filtering the waste water of sewage, promotes deep penetration of the suspended substances which are to be retained or held back into the filter bed, and thus, at the start of filtration produces a deep filter effect leading to better utilization of the sand bed.

If during the second filling of the fixed bed-filter there is utilized a substance for the spontaneous decomposition which gives off oxygen, then an oxygen supply collects in the bed by virtue of the $O_2$-bubble formation, which, in turn, leads to the beneficial result that for a certain period of operation of the filter the oxygen requirement of the fixed bed-filter is satisfied by this gaseous oxygen supply which remains in the pores of the fixed bed-filter. Consequently, there is enhanced the activity of the desirable aerobic microorganisms. Triggering of the decomposition reaction can be again accomplished either by catalytically effective substances present in the filter — for example, by enzymes of aerobic microorganisms which intentionally remain alive during backwashing and encase the sand granules or grains in the form of a fine biological film — or by the external addition of a catalyst.

Since directly following the step of conditioning of the fixed bed-filter there occurs the filtration operation, it is particularly important, under circumstances, during this method step that — above all during purification of drinking water — there does not occur any impermissible loading of the filter with residual products of the decomposition reaction. Therefore, it has been found to be particularly advantageous for the conditioning of the fixed bed-filter to use hydrogen peroxide as the spontaneous decomposing substance. Hydrogen peroxide decomposes into water and oxygen without the need to add additional foreign ions or molecules to the filter bed. Further details of this filter-conditioning operation constitutes subject matter of our commonly assigned United States application Ser. No. 771,958, filed Feb. 28, 1977 and entitled "Method of Improving The Operation of Backwashable Fixed Beds Formed Of Granular Materials ", the disclosure of which is incorporated herein by reference.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates a down flow-sand bed filter together with the components of the installation which are required for carrying out the novel flushing method of the invention.

DETAILED DESCRIPTION OF THE PREFERRED EMBODIMENTS

Describing now the drawing, the fixed bed-filter will be seen to comprise a sand bed 1 which, for instance, is supported upon a conventional nozzle floor 2 within a suitable vessel or basin 3. At the upper edge of the basin 3 there are provided overflow edges 4 leading to collecting troughs or chambers 5 for the backwashing water. A withdrawal line 6 for the backwashing water leads away from the collecting troughs 5 and which, for instance, itself can be subjected to treatment or otherwise used.

The supply of the fixed bed-filter 1 with the raw water or other influent to be filtered is accomplished with the aid of a pump 7 by means of an infeed line or conduit 8 which delivers such influent into the water chamber 9 which is located above the fixed bed-filter or filter bed 1. Below the nozzle floor 2 there is arranged a collecting chamber 10 for collecting the purified water which flows downwardly through the filter bed 1. The filtered water is removed out of the chamber or compartment 10 by means of a purified water conduit or line 12 which can be closed by any suitable shut-off element 11, typically a valve.

A floor outlet or discharge line 13, which can be closed by a shut-off element 14, again for instance a valve, serves to withdraw, for instance at the end of a predetermined filtration time, water which is still contaminated and does not fulfill the requirements placed upon the filtrate.

To carry out conventional backwashing operations, which as is well known are carried out with water, air or an air-water mixture, the illustrated embodiment of equipment is provided with an air conduit or line 31 equipped with an adjustable throttle element 30 which can be shut-off, through which are delivered by a compressor 32 is sucked-up and forced under pressure into the chamber or compartment 10.

By means of a controllable backwashing pump 15, it is possible to deliver, by means of the line or conduit 16, to the filter bed 1, backwashing water or other suitable backwashing liquid or a liquid catalyst, for instance the previously mentioned catalase, which is stored in a storage container or vessel 17. Thus, with the throttle- or shut-off element 18 open and the closable throttle elements 19 and 20 closed the pump 15 withdraws backwashing water only from the conduit or line 21, or else, with the element 19 open and the shut-off elements or valves 18 and 20 closed, the pump withdraws liquid containing the spontaneous decomposing substance out of the conduit or line 22. The liquid is delivered to the conduit or line 22 in a concentration which is already suitable for filling the filter bed or fixed bed-filter 1. Of course, it is however also possible to at least partially simultaneously open both of the adjustable throttle or valve elements 18 and 19 and to dose-in the substance delivered in concentrated form into the line or conduit 22 into the reflushing water stream, if desired with the aid of a not particularly illustrated conventional dosing device.

As already mentioned, the container 17 contains a liquid catalyst, for instance the aforementioned catalase, if there is used as the liquid a hydrogen peroxide solution. This catalyst is conveyed by means of a dosing pump 23, and with the valve 20 open and the lines 21 and 22 closed by the associated valves or throttle elements 18 and 19, by means of the conduit or line 24 to the suction side of the pump 15 and from that location dosed into the liquid filling of the filter bed 1. This additional additive of catalyst is undertaken in the event that the composition of the filter bed and/or the contaminants contained therein are not capable of triggering the spontaneous decomposition reaction or not capable of accelerating such decomposition reaction in a manner as needed for the sudden release of the gas bubbles. Of course, it is also possible to introduce the catalyst in a different manner directly into the filter bed which is filled with the liquid as previously discussed.

If catalase and/or spontaneous reacting substance are introduced in a concentrated state, then for the purpose of improving the admixing of these substances with the backwashing water a static mixing element 36 located at a bypass to a shut-off element 35, such as a valve, of the conduit or line 16 can be incorporated into operative association with the backwashing stream by opening the shut-off elements 37 and 38 and simultaneously closing the shut-off element 35.

The backwashing operation contemplated by the novel method of the invention and which, as mentioned, also can be employed with conventional backwashing of the fixed bed-filter proceeds in the following manner, wherein it is to be noted that in the example herein given the liquid containing the decomposing substance is present in an aqueous solution containing about 3% by weight hydrogen peroxide.

Considering the backwashing operation of the invention more specifically, if for instance such backwashing of the filter bed 1 is needed as determined by any suitable time control, then intially the infeed pump 7 for the influent is turned-off and the shut-off element or valve 11 located in the clean water line 12 is closed. Thereafter, the filter is emptied as rapidly as possible by means of the floor outlet 13 after opening the valve 14. This procedure generally requires several minutes.

After closing the valve 14 and following opening of the shut-off valve 19, the filter bed 1 is filled with the aid of the pump 15 by means of the conduit 22 and via the backwashing line 16 with a 3%-$H_2O_2$-solution until reaching the level of the overflow edge or weir 4. After turning-off the pump 15 and closing the shut-off element 13, this solution remains static in the filter bed 1 for about 10–15 minutes. During this time the $H_2O_2$, for instance by virtue of its concentration gradient, can penetrate into the mud balls and, when necessary depending upon the condition of the filter, into the aerobic or anaerobic sand granule coatings with slimes. Since, as mentioned, these impurities for the most part consist of microorganisms and organic substances, after the penetration into the impurities there occurs with great probability a decomposition reaction of the $H_2O_2$ into water and oxygen, this reaction being catalytically triggered for instance by the catalase. The decomposition reaction produces gas bubbles containing a relatively large quantity of energy in the form of kinetic energy. The formation, enlargement and migration of the gas bubbles brings about a beneficial loosening or disintegration and tearing-up of the mud balls, from which there are detached under circumstances considerable parts thereof.

Due to a subsequent addition of catalysts it is possible, as already explained, to check if the decomposition reaction has been completed.

The formed oxygen has a secondary effect, namely triggers oxidative processes by virtue of which, for instance, it is possible under circumstances to destroy anaerobic organisms.

If the reactions have essentially gone to completion, then by opening the shut-off element 18 and by placing into operation the controllable backwashing pump 15 the bed can be backwashed with water, and at least a large part of the mechanically and/or oxidatively destroyed impurities can be washed-out and flow-off by means of the overflow edge or edges 4, the troughs 5 and the conduit 6. The washing of the filter bed 1 is augmented and improved by virtue of the previously explained flotation action which is realized due to deposition of gas bubbles at the suspension particles.

After closing the shut-off valve 18 and turning-off the controllable backwashing pump 15 as well as opening the shut-off element 11 and turning-on the feed pump 7 it is now possible to again carry out the filtering operation at the fixed bed-filter or filter bed 1.

However, if prior to the renewed filter operation the filter bed 1 is to be further conditioned in the described manner, whereby owing to the dry filter effect there can be obtained an increase in the filter operating time and furthermore during a part of this operating time an improved aerobic behavior in the filter bed, then following the washing-out of the impurities and placing the pump 15 again into operation and opening the shut-off elements 18 and 19 it is possible to carry out refilling of the filter bed 1 with a $H_2O_2$-solution which in this case amounts to about 0.1%. This filling operation is carried out likewise for about 10 minutes, during which there again occurs the spontaneous decomposition reaction which under circumstances can be triggered by the addition of catalase. After expiration of this time there is carried out the normal filter operation, without again flushing the filter bed.

During this second filling of the filter bed and during such time as there occurs the reaction therein, the sand bed or filter bed 1 is loosened and the resultant gas bubbles adhere to the sand granules or grains, so that the sand bed becomes "aerated" i.e. more pervious in the manner of a dry filter, and there occurs the action described as the dry filter effect. This behavior is present for about 4 to 5 hours just as the aerobic behavior which is improved due to the oxygen which is bound at the granules, before the oxygen is ultimately consumed by the manifold microbiological processes occurring in the filter bed and by the oxygen consuming-suspension substances or particles additionally retained in the filter bed 1. Of course, the conditioning of the filter bed 1 is not limited to a previous backwashing with an $H_2O_2$-solution, rather can also be employed as the last step of each backwashing process.

The backwashing method of the invention can be beneficially used both with upward and downward flow fixed beds. The backwashing method executed as described in the previous example is particularly advantageous in the case of upward flow filters too, since with a filter through which the flow proceeds upwards the impurities for the most part are located at the bottom of the fixed bed, so that the fresh backwashing liquid impinges directly at the part of the bed which is most dirty and clogged with impurities.

For the same reasons, it can be advantageous under circumstances with downflow filters to load the filter for the backwashing operation with the liquid from the top towards the bottom, since with a downflow filter the impurities are present most intensively at the upper layers.

Of course, the filter can be impinged with the liquid emanating from a conduit system also at about one-half of the height of the filter. Finally, there is also the possibility of simultaneously filling the bed both from the top and the bottom with the liquid.

While there are shown and described present preferred embodiments of the invention, it is to be distinctly understood that the invention is not limited thereto, but may be otherwise variously embodied and practiced within the scope of the following claims.

What we claim is:

1. A method of improving the backwashing of fixed beds composed of granular material and employed in the purification of waste water of sewage or in the preparation of water, comprising the steps of:
    filling the fixed bed during the course of a backwashing operation with a liquid containing hydrogen peroxide;
    maintaining the fixed bed filled with said liquid during a predetermined period of time while the liquid is in a substantially quiescent state;
    contacting said liquid containing hydrogen peroxide with at least one catalyst taken from the group consisting essentially of granular iron, manganese dioxide, potassium permanganate, or an enzyme or enzyme product of a microorganism which yields oxygen as a gaseous component as a result of a spontaneous, catalytically triggered decomposition reaction;
    allowing such decomposition reaction to occur in the fixed bed and rapidly releasing gaseous oxygen in a short time to intensely agitate the filter bed; and
    then backwashing the fixed bed of water.

2. The method as defined in claim 1, wherein:

the spontaneous, catalytically triggered decomposition reaction occurs in the fixed bed due to the presence of enzymatic products of microorganisms contained in the fixed bed.

3. The method as defined in claim 1, further including the step of:
promoting the spontaneous, catalytically triggered decomposition reaction by adding a catalyst.

4. The method as defined in claim 3, wherein:
said catalyst is added to the liquid.

5. The method as defined in claim 4, further including the step of:
utilizing as the catalyst an enzyme.

6. The method as defined in claim 5, wherein:
said enzyme is catalase.

7. The method as defined in claim 1, further including the step of:
triggering the spontaneous, catalytically triggered decomposition reaction by means of a catalyst which is added to the liquid which fills the fixed bed.

8. The method as defined in claim 7, wherein:
said catalyst is an enzyme.

9. The method as defined in claim 8, wherein:
said enzyme is catalase.

10. The method as defined in claim 1, further including the step of:
subjecting the fixed bed to conventional flushing with any one of water, air, and a water-air mixture.

11. The method as defined in claim 10, further including the step of:
filling the fixed bed with the liquid containing the spontaneously reacting substance prior to the conventional backwashing operation.

12. The method as defined in claim 10, further including the step of:
filling the fixed bed with the liquid containing the spontaneously reacting substance during the conventional backwashing operation.

13. The method as defined in claim 10, further including the step of:
filling the fixed bed with the liquid containing the spontaneously reacting substance after the conventional flushing operation.

14. The method as defined in claim 1, further including the steps of:
subjecting the fixed bed to a conditioning step as the last method step of the backwashing operation, prior to placing into operation the fixed bed, by further filling the fixed bed with a liquid containing a spontaneously reacting substance.

15. The method as defined in claim 14, further including the step of:
triggering the reaction during the second filling of the fixed bed by adding a catalyst.

16. The method as defined in claim 14, further including the step of:
selecting for the second filling of the fixed bed as the substance for the spontaneous reaction a substance which gives off oxygen.

17. The method as defined in claim 16, further including the step of:
selecting as the spontaneously reacting substance a material which forms a decomposition product which does not impair the quality of the filtrate.

18. The method as defined in claim 16, further including the step of:
selecting as the substance which gives off oxygen hydrogen peroxide.

19. The method as defined in claim 18, wherein:
the concentration of the hydrogen peroxide amounts to no more than 3% by weight of the liquid.

20. The method of claim 18 wherein the concentration of hydrogen peroxide employed in conditioning said filter bed amounts to about 0.1 percent by weight of the conditioning liquid.

21. The method of claim 1 further including the steps of:
draining the liquid from the filter bed prior to introducing the filling liquid containing up to 3% weight hydrogen peroxide; and
maintaining the filling liquid in the filter bed for a predetermined time sufficient to permit the generation of oxygen bubbles in sufficient quantity to agitate said granular material.

22. The method of claim 21 wherein the time for generating gaseous oxygen within the filter bed is up to about 15 minutes, at the end of which time, the backwashing step is carried out.

23. The method of claim 1 wherein said fixed bed includes aerobic microorganisms, said granular material becoming encrusted with algae or the like during the purification procedure and forming agglomerates, said regeneration procedure being employed to eliminate said agglomerates without adversely effecting the aerobic microorganisms, said gaseous oxygen acting to float particles in the filter bed which are liberated by the agitation.

* * * * *